(12) United States Patent
Doane et al.

(10) Patent No.: US 12,051,920 B2
(45) Date of Patent: Jul. 30, 2024

(54) SOLAR CHARGING OF MULTIPLE BATTERY BANKS

(71) Applicant: eNOW Systems LLC, Warwick, RI (US)

(72) Inventors: Robert W. Doane, Harwich, MA (US); Jeffrey C. Flath, Warwick, RI (US); Ryan Kennedy Kemmet, Phoenix, AZ (US)

(73) Assignee: eNow Systems LLC, Warwick, RI (US)

( * ) Notice: Subject to any disclaimer, the term of this patent is extended or adjusted under 35 U.S.C. 154(b) by 0 days.

(21) Appl. No.: 18/338,861

(22) Filed: Jun. 21, 2023

(65) Prior Publication Data
US 2023/0336005 A1 Oct. 19, 2023

Related U.S. Application Data

(63) Continuation of application No. 17/215,721, filed on Mar. 29, 2021, now Pat. No. 11,728,659, which is a
(Continued)

(51) Int. Cl.
*H02J 7/00* (2006.01)
*H02J 7/14* (2006.01)
(Continued)

(52) U.S. Cl.
CPC .......... *H02J 7/0013* (2013.01); *H02J 7/1438* (2013.01); *H02J 7/35* (2013.01); *H02J 7/0014* (2013.01); *H02J 7/0048* (2020.01); *H02J 7/143* (2020.01); *H02J 7/342* (2020.01); *H02J 2207/40* (2020.01); *H02J 2310/40* (2020.01)

(58) Field of Classification Search
None
See application file for complete search history.

(56) References Cited

U.S. PATENT DOCUMENTS 8,004,242 B1 * 8/2011 Purkey .................. B60R 16/033
320/132
8,295,950 B1 10/2012 Wordsworth et al.
(Continued)

FOREIGN PATENT DOCUMENTS

WO 2011/094099 A1 8/2011

*Primary Examiner* — Jared Fureman
*Assistant Examiner* — Aqeel H Bukhari
(74) *Attorney, Agent, or Firm* — Pauley Erickson & Swanson

(57) ABSTRACT

A power management and selection system for a class 8 tractor trailer, directs excess solar and vehicular charge capacity to an auxiliary load by measuring available charge capacity from a reefer power system including a reefer battery, solar panel and charge controller for moderating solar power to the reefer batter, and measuring available charge capacity from a cab vehicle power system including a propulsion system battery and alternator. Charge logic, in a selector configured for switching charge capacity to the auxiliary load, determines which of the reefer power system and cab vehicle power system has the most potential excess charge capacity, and directs the determined excess charge capacity to the auxiliary load, while the measured available charge capacity remains sufficient for powering the respective reefer power system or cab vehicle power system.

20 Claims, 7 Drawing Sheets

Related U.S. Application Data continuation-in-part of application No. 15/951,628, filed on Apr. 12, 2018, now Pat. No. 10,965,147, which is a continuation of application No. 14/588,545, filed on Jan. 2, 2015, now Pat. No. 9,948,136.

(60) Provisional application No. 61/922,939, filed on Jan. 2, 2014.

(51) Int. Cl.
*H02J 7/35* (2006.01)
*H02J 7/34* (2006.01)

(56) References Cited

U.S. PATENT DOCUMENTS

| | | |
|---|---|---|
| 9,948,136 B2 | 4/2018 | Doane et al. |
| 2010/0171364 A1 | 7/2010 | Awwad |
| 2011/0025126 A1 | 2/2011 | Brabec |
| 2011/0316298 A1 | 12/2011 | Rampersad |
| 2013/0000342 A1 | 1/2013 | Blasko et al. |
| 2014/0116077 A1* | 5/2014 | Pierce .................. F25B 27/002 219/202 |

* cited by examiner

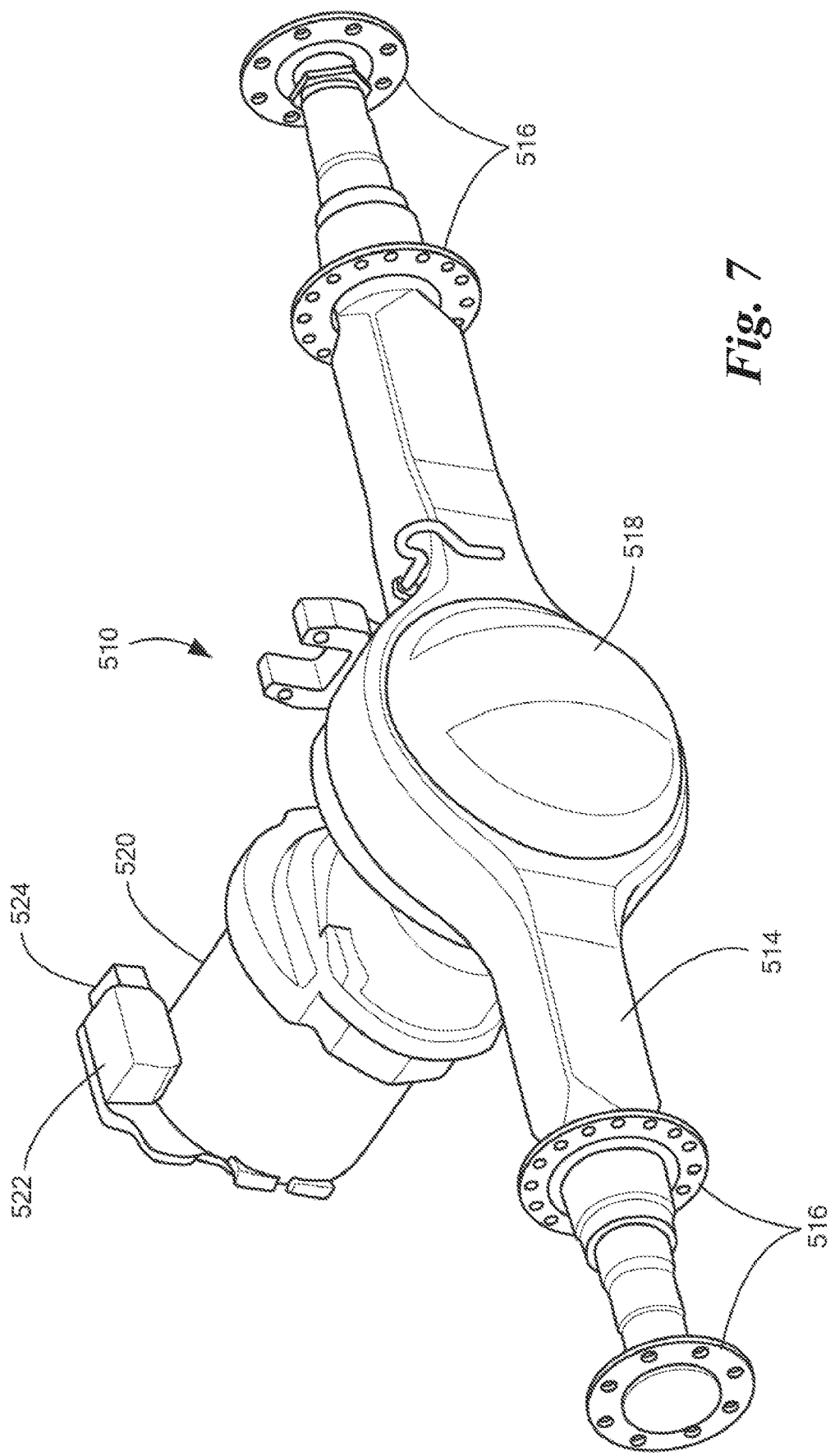

SOLAR CHARGING OF MULTIPLE BATTERY BANKS

RELATED APPLICATIONS

This application is a continuation of U.S. application Ser. No. 17/215,721, filed Mar. 29, 2021, entitled "SOLAR CHARGING OF MULTIPLE BATTERY BANKS," which is a continuation-in-part (CIP) of U.S. application Ser. No. 15/951,628, filed Apr. 12, 2018, entitled "SOLAR CHARGING OF MULTIPLE BATTERY BANKS," now U.S. Pat. No. 10,965,147, which is a continuation of U.S. application Ser. No. 14/588,545, filed Jan. 2, 2015, now U.S. Pat. No. 9,948,136, which claims the benefit under 35 U.S.C. § 119(e) of U.S. Provisional Patent Application No. 61/922,939, filed Jan. 2, 2014, entitled "SOLAR CHARGING OF MULTIPLE BATTERY BANKS," incorporated herein by reference in entirety.

BACKGROUND

Modern focus on energy conservation is becoming increasingly popular as emerging technologies seek to leverage previously untapped energy sources. Many corporations are seeking energy conserving and environmentally friendly practices in an effort to label their business pursuits as "green." Particularly in the transportation industry, where dependence on petroleum-based fuels has underscored the need for improvement towards energy independence, energy sources and costs are particularly scrutinized. Legislative activities have also compelled energy conscious strategies, from voluntary measures including tax incentives, to mandates such as laws limiting vehicle idling time, such that energy considerations are a necessary aspect of any commercial endeavor in the transportation industry. Further compounding the relevant issues are the realities of transport logistics, such as maintaining refrigeration units in the absence of an idling engine, and powering a liftgate for unloading when the engine is unavailable for hydraulic support in view of no-idle practices.

In the case of class 7 or 8 trucks, more commonly known as "18 wheelers" due to the common articulated wheel structure, efficient power management is paramount, because the 12v alternator system in the propulsion unit (cab) is driven by the relatively large diesel propulsion engine. Usage of storage batteries (batteries) and other sources to power loads serves as an alternative to excessive idling of a large diesel engine merely for drawing a 12 v current. Further, other "high draw" accessories often utilized include refrigeration ("Reefer") units and liftgate hydraulics, both of which often have a dedicated battery and/or generator.

SUMMARY

A vehicle energy management system for a trailer vehicle having a plurality of electrical loads powered by rechargeable power repositories implements a method for charging the power repositories, such as batteries, by determining when a primary power source has excess capacity for charging an auxiliary load, and directing the excess capacity to the auxiliary load. A selector monitors the primary power source for an excess charge capacity approaching a minimal level, and terminates the charge capacity to the auxiliary load, to avoid compromising higher priority loads, until the primary power source again has excess capacity.

The disclosed selector switches, or connects, charge sources to charge consumers (typically batteries) according to a prioritization of loads so that critical, or higher priority loads are not compromised by lower priority loads, but still allows a common charge source or mechanism to benefit multiple consumers. In a basic configuration, the selector may take the form of a battery separator between two batteries which monitors each battery and switches on or off depending upon voltage levels. Alternate configurations are responsive to additional factors such as temperature, weather, and predicted demand which apply a forward looking consideration or different tiers or thresholds of charge levels, instead of a simple unitary threshold. More advanced configurations may also adapt to different voltage characteristics between charge sources and consumers, and invoke appropriate transformers as needed. Battery "charge level," as applied herein, is often referred to as a voltage level. It should be noted that, while voltage level is often a beneficial indicator of a charge level, it is an approximation of the available electrical energy in charge material in a battery. The available electrical energy is also affected by other factors such as battery chemistry, the amp-hour rating of the battery, and the load, or current draw demanded of the battery, and the degree to which the voltage level mirrors remaining capacity can vary.

Configurations herein are based, in part, on the observation that vehicles such as a tractor trailer or "18 wheeler" trucks often maintain several support systems or accessories in addition to the main propulsion engine and associated charging/starter system. Refrigerator trailers often maintain a separate diesel engine and generator system, along with a dedicated starter battery. Also, liftgate systems operate a hydraulic or geared platform from a separate battery. Comfort stations are often designed for providing drivers an area for rest and accommodation on long hauls, but have recently come under scrutiny as promoting wasteful idle time as the propulsion engine is run merely to accommodate the comfort amenities.

Unfortunately, conventional approaches to vehicular power management suffer from the shortcoming that various electrical loads on a vehicle often maintain separate power and charging systems, due to differing voltage characteristics or the need to monitor the relative charge and demand in each system to provide appropriate switching and avoid draining one system by connecting to a system with a lower charge s capacity.

Accordingly, configurations herein substantially overcome the above-described shortcomings by providing a charging approach that can effectively be shared among multiple loads, each defining an individual power system, from a single charge source that may include regulated sources such as solar panels.

A methodology for charging multiple system batteries on a truck or trailer using only one solar source and associated charge controller circuitry minimizes cost and facilitates distribution of excess charge from the solar panels so that individual power systems are not run down. The selector coupling the solar source to multiple loads is configured to charge one set of auxiliary batteries, usually liftgate batteries, from multiple energy sources including the truck engine alternator or diesel refrigeration starter battery (referred to as the "reefer"). In conventional systems, if both the liftgate batteries and the reefer battery are intended to be charged or trickle charged from a solar source, then two solar systems are needed with accompanying charging regulation equipment. Since a reefer may be preserving a large, perishable load, it generally is seen as the higher priority power system.

However, if the reefer batteries are already at a capacity charge, conventional approaches would still allow the liftgate batteries to degrade, since conventional approaches do not allow sharing of the charge between different power systems. In contrast, in the disclosed approach, the refer battery is charged with solar energy, then excess solar energy is diverted through the selector to charge the auxiliary liftgate batteries. By adjusting the solar output voltage to the reefer battery, the selector will behave as if the reefer engine is running, and thus select the solar output voltage as a source of power to feed to the liftgate (or other auxiliary) batteries. Multiple ranges of voltage may also be observed or adjusted (such as through a transformer) to accommodate different voltage characteristics between the solar output voltage and the charge consumer.

In an example arrangement, depicting a power management and selection system for a class 8 tractor trailer, a method for directing excess solar and vehicular charge capacity to an auxiliary load includes measuring available charge capacity from a reefer power system including a reefer battery, solar panel and charge controller (for moderating solar power to the reefer battery), and measuring available charge capacity from a cab vehicle power system including a propulsion system battery and alternator. Charge logic, in a selector configured for switching charge capacity to the auxiliary load, determines which of the reefer power system and cab vehicle power system has the most potential excess charge capacity, and directs the determined excess charge capacity to the auxiliary load, while the measured available charge capacity remains sufficient for powering the respective reefer power system or cab vehicle power system.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 7 is a perspective view of the generative axle in FIG. 6.

DETAILED DESCRIPTION

Figure 1:
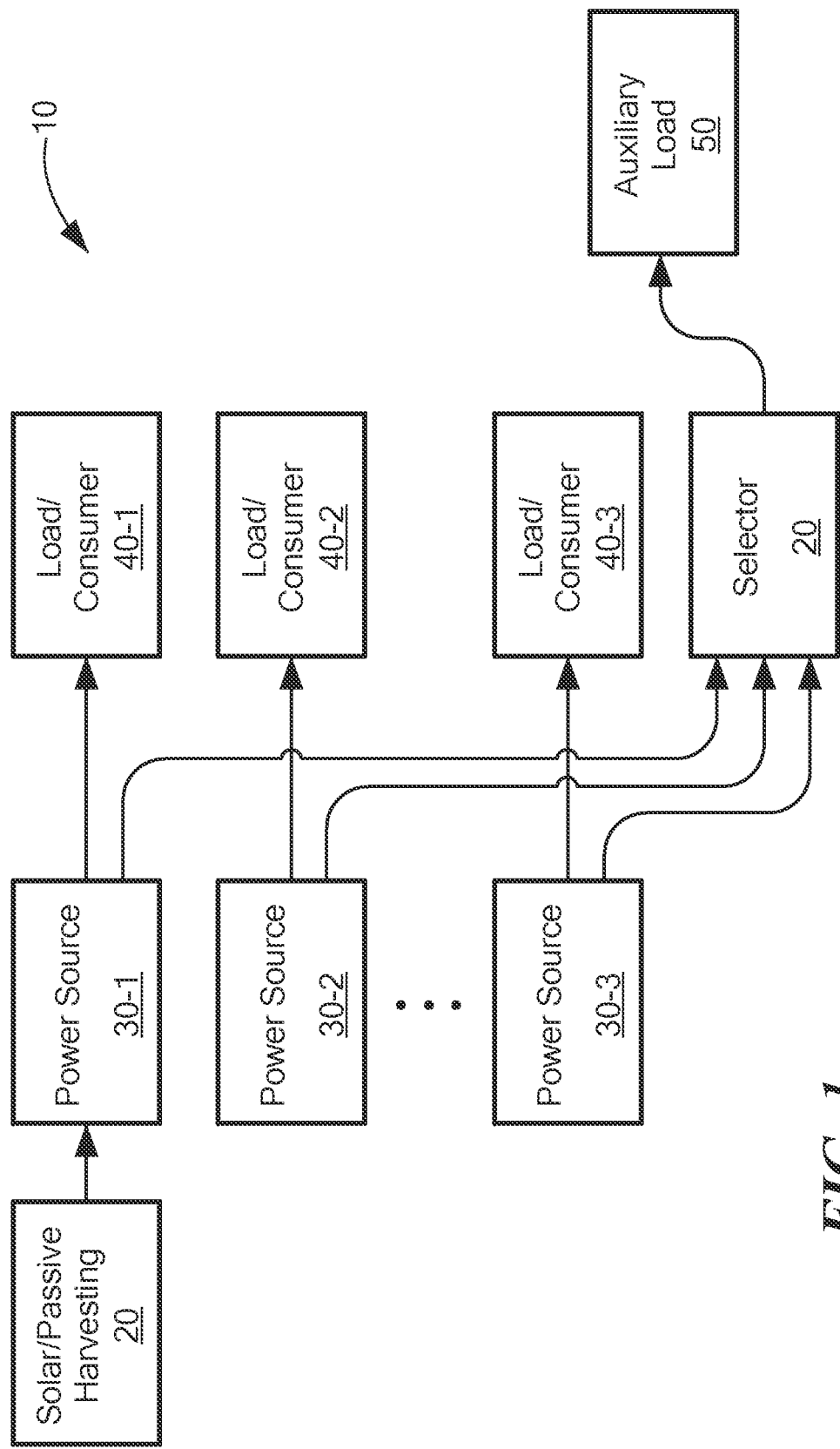
FIG. 1 is a context diagram of the energy storage and management system as shown in configurations herein.

An example configuration below depicts a tractor trailer configuration including a trailer with roof mounted solar panels and a liftgate. The disclosed approach is an example, and other configurations of primary sources and auxiliary loads could be envisioned. The trailer is a reefer with a dedicated generator and cooling unit and dedicated starting battery. The selector is configured to favor the reefer unit (primary load), with the excess charge capacity going to the liftgate unit. In this manner, the starter battery for the reefer will be maintained from the solar panels, avoiding any compromise of a refrigerated load. If the liftgate battery is in demand, the controller looks first to the vehicle alternator/battery/charging system, but if the vehicle is dormant would then look to the solar panels. Only if the reefer battery is sufficiently charged would the selector then switch and divert solar power for the auxiliary load, in this case the liftgate.

Management of vehicle energy loads, such as refrigeration (Reefer) units, liftgates, comfort systems such as HVAC, and other vehicle subsystems require additional and more sophisticated energy management to maintain operation in the absence of direct vehicle engine power in the wake of increasing idling regulation. Accordingly, configurations herein disclose a switching device ("selector") including an interface to a plurality of power sources, such as the vehicle battery and charging system as well as solar panels, and a storage element for receiving and storing the power from the power sources. The storage element, or bank of batteries, stores energy from the solar panels, and is apportioned and controlled among the vehicle subsystems such that one solar charge system including a solar panel and charge controller can charge two diverse battery system via the selector controlled system.

The switching device, also known as a selector, includes a connection to an auxiliary load, such as a liftgate, and control logic for determining which of the plurality of power sources to invoke for powering the auxiliary load. The control logic prioritizes the determined power source based on the potential for powering the auxiliary load without compromising a higher priority load, typically the refer battery so it is available to start the reefer engine. The control logic directs a switch responsive to the control logic for connecting the determined power source to the auxiliary load. In this manner, high priority loads such as the reefer, preserving perishable cargo, maintain a higher priority, and excess power is employed for powering the liftgate to facilitate unloading or minimizing vehicle engine powering of the liftgate, while also avoiding a possible compromise of the payload due to insufficient reefer operation.

Conventional approaches to vehicle charge management direct vehicle alternator power among accessories in the vehicle. No provision is made for external power supplies such as solar power or "shore power" from fixed power stations, and no provision is made for power/charge regulation from external sources such as solar panels, which may have varying levels of input voltage. One particular conventional methodology for charging multiple system batteries on a truck or trailer using a switching mechanism is shown is U.S. Pat. No. 8,004,242). The '242 patent, however, discloses switching only between 12 v vehicle alternator and battery systems, specifically a reefer (refrigerator) and main propulsion (cab) 12 v system. There is no showing, teaching or disclosure of selecting excess charge capacity from different systems, such as solar based, regenerative braking or axles (e-axles), shore power, regenerative shock absorbers, and other systems which may operate at different voltage characteristics. In particular, the '242 approach includes charging one set of auxiliary batteries, usually liftgate batteries, from multiple energy sources including the truck engine or diesel refrigeration starter battery. Conventionally, if both the liftgate batteries and the reefer battery are desired to be charged or trickle charged from a solar source, then two solar systems are needed with accompanying charging regulation equipment. Conventional approaches cannot charge batteries of different electrical systems from a common solar panel bank or other source of power which may have differing electrical characteristics. Merely coupling together dissimilar systems (i.e. other than 12 v alternator/battery systems) in an attempt to distribute excess charge can merely result in the lower potential elements discharging the higher potential (voltage) elements.

In contrast, in configurations herein, the reefer battery receives prioritized charging from solar energy via the solar panels; subsequently excess solar energy is diverted through the selector to charge the auxiliary liftgate batteries. By adjusting the solar output voltage, which may include modifying or transforming voltage characteristics, to the reefer battery, the selector will behave as if the reefer engine is running thus select that as a source of power to feed to the liftgate (or other auxiliary) batteries. A charge regulator is employed for regulating the power to the storage element, such that the charge regulator regulates the auxiliary load batteries when the control logic selects the power source connected to the storage element. Therefore, a single system consisting of a solar panel and charge controller can charge two diverse battery systems via a selector system. The solar system will properly maintain the charge of the battery systems without overcharging, and the system will work on class 8 tractor/trailer combinations or any suitable heavy duty truck or vehicle.

The charge regulator further includes a connection to at least one solar panel and a charge controller operative to charge two diverse battery systems via the switch. In a particular configuration, the higher priority load is a reefer, although other suitable arrangements of powered appliances may be employed. Further, in a particular configuration, the auxiliary load is a power liftgate system and the power source is a bank of one or more solar panels mounted on the roof of the trailer, however other configurations could be envisioned.

FIG. 1 is a context diagram of the energy storage and management system as shown in configurations herein. Referring to FIG. 1, in the class-8 tractor trailer environment 10, primary power sources 30-1 . . . 30-N (30 generally) include individual power systems dedicated to particular vehicle functions or accessories, such as the propulsion engine alternator, reefer generator, and solar panels. A bank of solar panels 20 connects to at least one of the loads, for supplementing a native power source such as a generator. It should be noted that, in general, some of the power systems include complementary generation and consumer entities, such as the alternator/battery combination, in which the alternator (or generator) supplies power to be stored in the battery while the battery may be charged from other sources such as the solar panels/controller.

Figure 6:
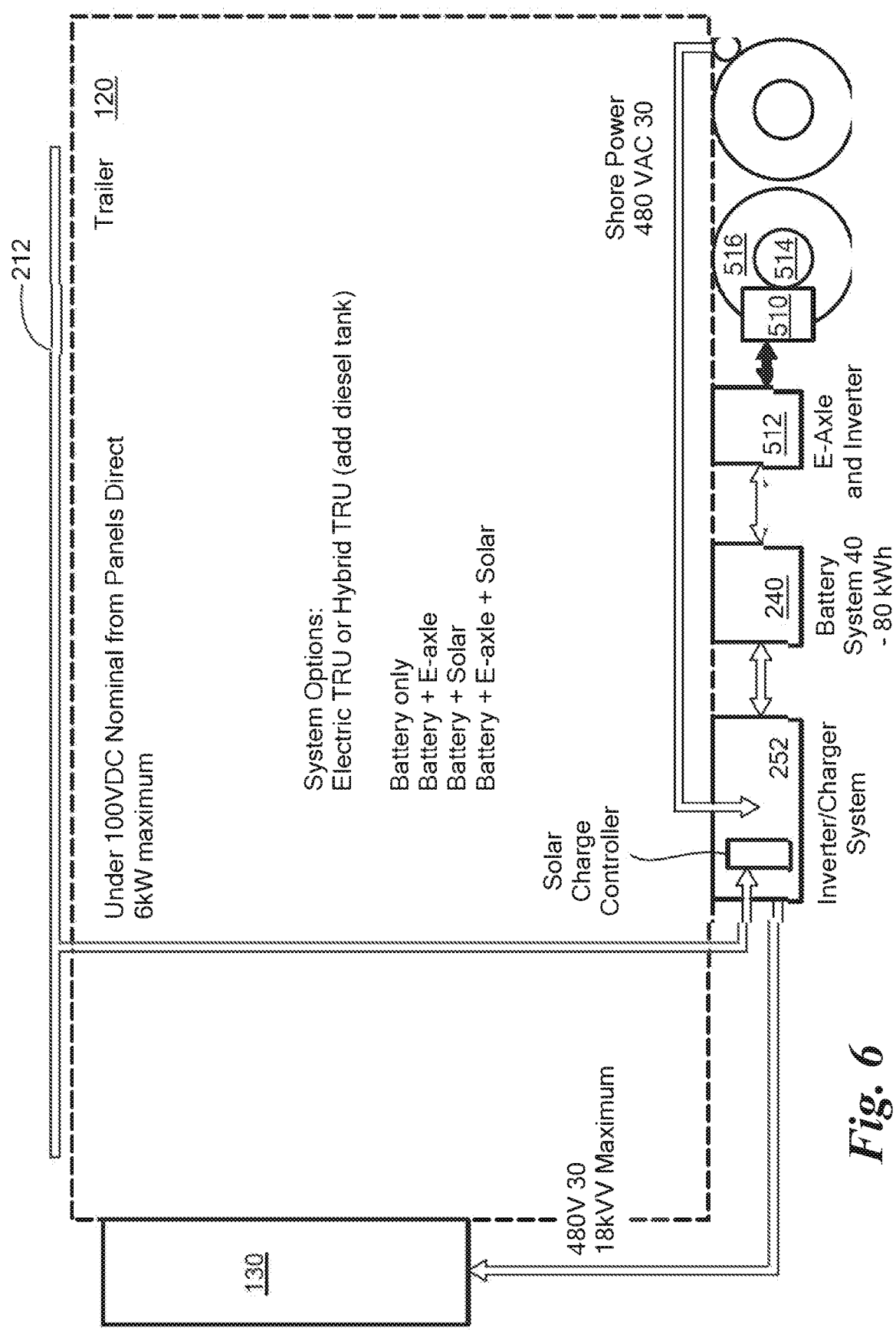
FIG. 6 is a schematic diagram of an alternate arrangement having a momentum generative axle (e-axle).

In the example arrangement, the primary power source includes a plurality of primary sources 30-1 . . . 30-N. Distributing the excess charge further includes identifying which of the primary sources 30 has the highest potential for excess capacity, and switching the auxiliary load 50 to receive the capacity from the primary source with the highest potential. At least one of the primary power sources 30 includes a solar panel and a charge controller 142 (FIG. 6). The controller 142 directs the excess capacity to the auxiliary load 50 when the charge controller 142 has charged the reefer power system near capacity.

Figure 2:
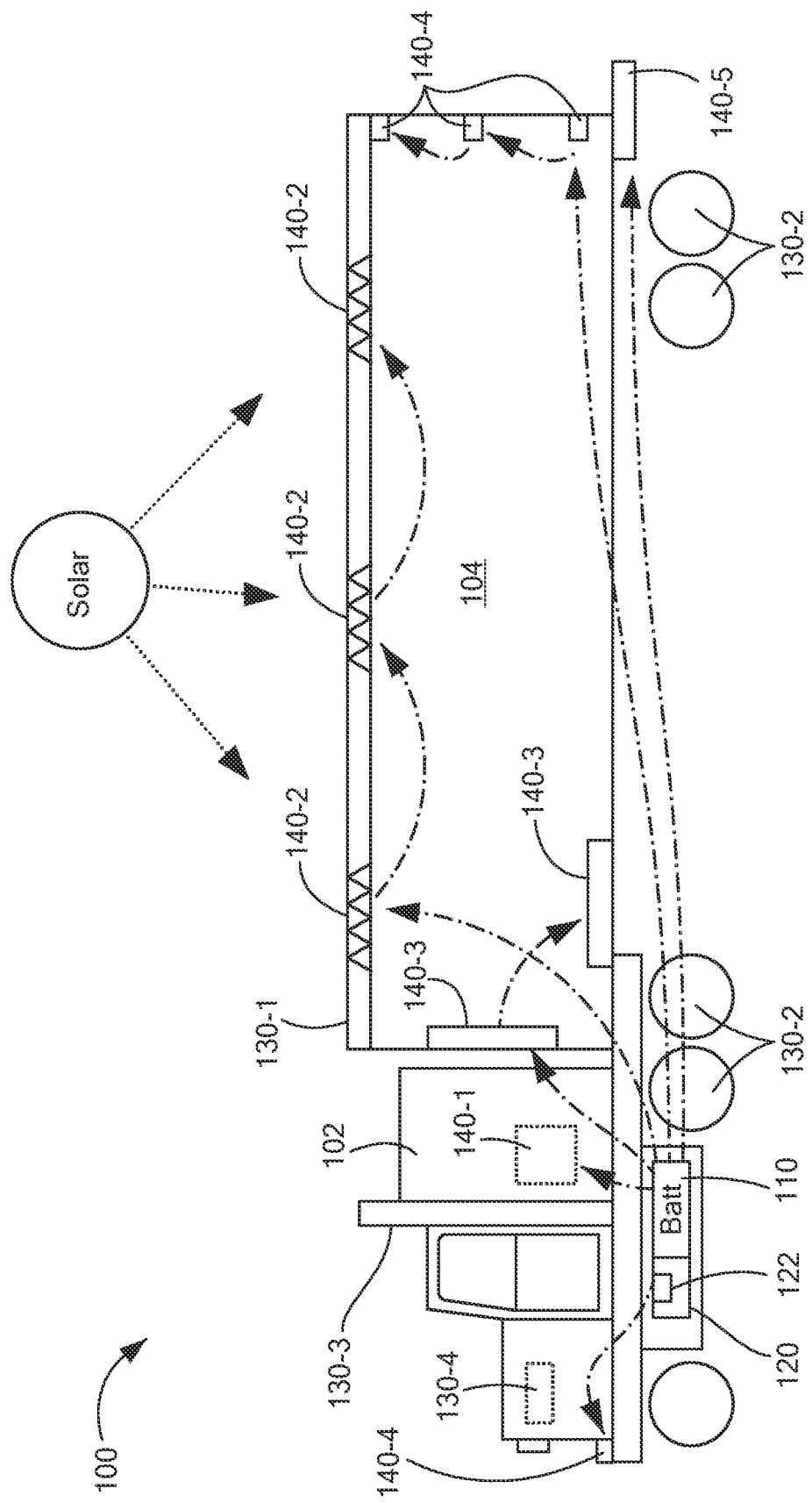
FIG. 2 shows a vehicular environment suitable for use with configurations herein.

FIG. 2 shows a vehicular environment suitable for use with configurations herein. Referring to FIGS. 1 and 2, a vehicle 100 such as an 18-wheeler has a storage unit 110, typically a battery, for storing electrical energy. An energy management selector 120 (selector) has management logic 122 for directing electrical power gathered from sources, such as solar panels 130-1, regenerative brakes 130-2, exhaust recovery 130-3, and the alternator 130-4 of the vehicle (130, generally). Other sources may also be employed. The management logic 122 directs the gathered power to loads such as a comfort systems 140-1 for a cab area 102, roof de-icing heaters 140-2, cold plates 140-3 for refrigerating the trailer payload 104, lighting systems 140-4, and liftgate 140-5 (140 generally). As disclosed above, in the example herein, the liftgate 140-5 takes the form of the lower priority auxiliary load 50.

The primary sources 130 include cab vehicle power and a reefer power system for powering a trailer refrigeration unit, such that the cab vehicle power provides a higher capacity when an alternator on the cab vehicle is activated by a running engine. Generally, alternators for charging run at a voltage about 10-20% higher than the nominal voltage of the battery to system that they support. Accordingly, a vehicle alternator for a typical 12 v system may put out about 14.4 v. Therefore, the excess charge capacity determination may be performed by comparing an output from the cab vehicle power and the reefer power to identify a higher voltage, and as indicated above, the cab vehicle power system generally comprises an alternator. The reefer power system, in the example arrangement, includes a solar panel and charge controller. Note that the disclosed approach purports to interconnect the charge sources as needed to the loads. In a typical installation, the reefer is deemed the highest priority load, and enjoys a direct connection to the solar panels. The selector 122 may be interfaced, for example, at the terminals of the reefer battery, thus receiving the charge from the solar panel while concurrently monitoring a current charge state of the reefer battery.

Figure 3:
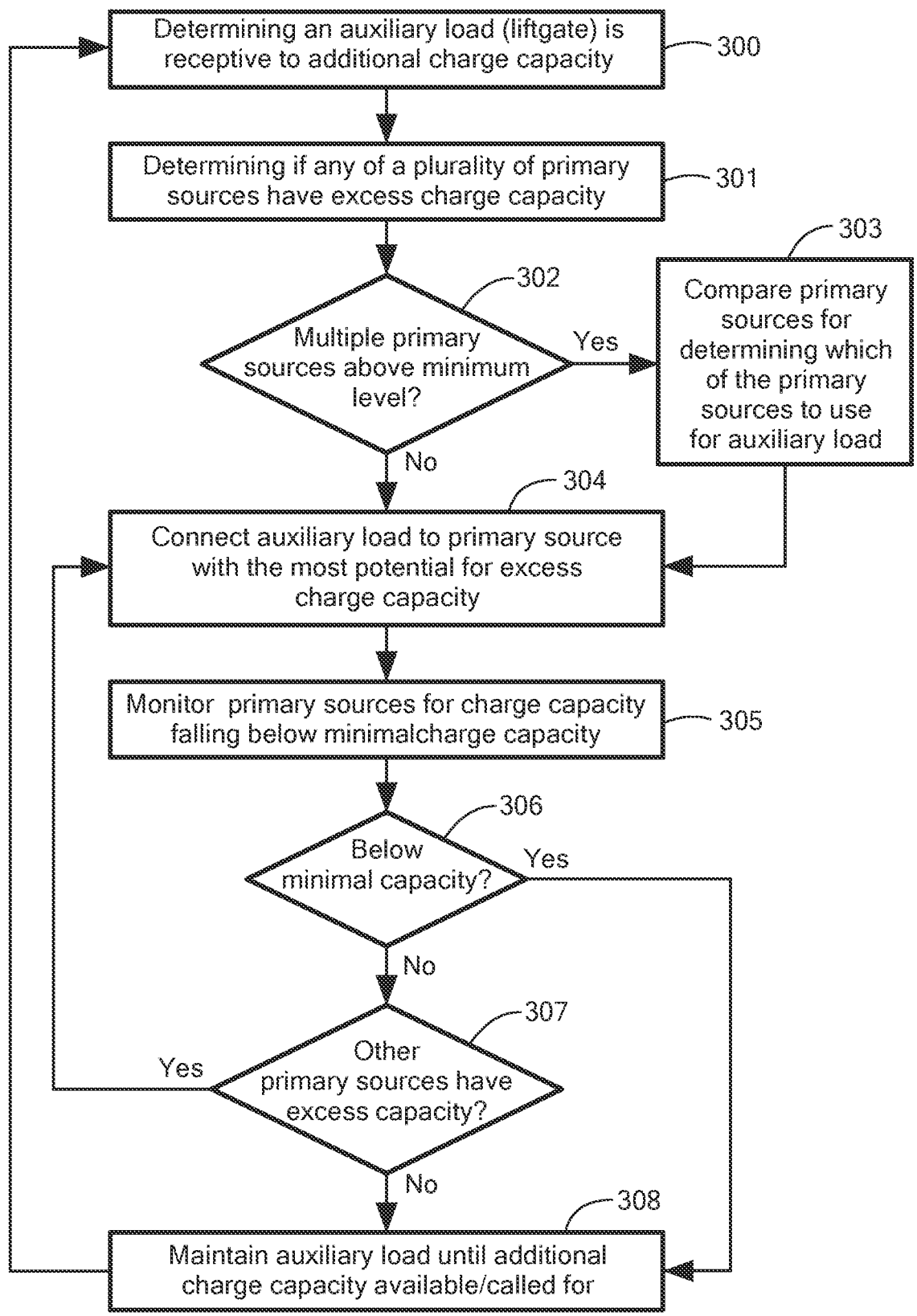
FIG. 3 is a flow chart of charge management logic as disclosed herein.

FIG. 3 is a flow chart of charge management logic as disclosed herein. Referring to FIGS. 1-3, at step 300, the selector 120 determines that an auxiliary load, such as a liftgate is receptive to additional charge capacity. Typically this involves a voltage check to identify charge capacity remaining in the battery, and if below a nominal amount, such as 10.8 volts, the battery would be deemed in need of a charge.

Accordingly, the charge logic 122 determines if any of a plurality of primary sources 30, such as the reefer battery, which is also supported/charged by the solar panels 140-2, are above their minimum level or otherwise have excess charge capacity, as depicted at step 301. A check is performed, at step 302, to determine if multiple primary sources 130 have excess charge, and if so, the selector 120 compares the primary sources for determining which of the primary sources 130 to use for the auxiliary load 140, as depicted at step 303. The selector 120 connects the auxiliary load to the primary source with the most potential for excess charge capacity, as shown in step 304. The primary source with the most potential may be the highest voltage level, however other factors may also be considered. If the propulsion engine is to be started shortly, then the vehicle alternator will likely have ample charge capacity available. Similarly, weather may be an important factor in determining solar panel contribution, as an overcast outlook presents a limited expectation of solar panel draw, while clear skies on an open road suggest ample potential.

Once the source is established an is powering/charging the auxiliary load, the selector 120 monitors the primary sources for a charge capacity falling below a minimal charge capacity, as depicted at step 305. A check is performed, at step 306, to determine if a primary source is below minimal capacity, as disclosed at step 306. If so, then the selector 120 looks to other primary sources to determine if any have excess capacity, as shown at step 307. Control then reverts to step 304, as the selector 120 diverts excess charge from the source 130 with the most potential, or if none are available, then maintains the auxiliary load until additional charge capacity is available and/or called for by the auxiliary load. In the example arrangement, the auxiliary load, reefer battery, and propulsion system battery operate on a nominal 12 v, so a low threshold might be 10.8, below which none of the primary sources would be permitted to fall. Similarly, a full or maximum charge, following which excess charge would be deemed available, might be 14.4 volts. Other thresholds may be employed, depending on cyclic demand and battery capacity and/or chemistry.

In the example arrangement, at least one of the primary power sources 130 includes a solar panel 140-1 and a charge controller 142. The selector 120 directs the excess capacity to the auxiliary load such as the liftgate 140-5 when the charge controller 142 has charged the reefer power system above at least a minimal level and the auxiliary load has a charge less than the reefer power system, hence is in need of charge. Thus, in the example configuration, the selector 120 receives charge voltage from the solar panel(s) 130-1, in which the charge voltage is regulated by the charge controller 142. The selector 12 charges a battery of the primary power source to a full charge (e.g. reefer battery), and then switches the excess capacity to charging a battery of the auxiliary load (e.g. liftgate), such that the battery of the auxiliary load is effectively regulated by the charge controller 142 for solar charging. In contrast to conventional approaches, this allows excess charge capacity to flow to the liftgate, but without requiring a separate charge controller. The selector 120 continues to monitoring the charge levels of the primary power source 130 and the battery of the auxiliary load 50 for charging from the charge controller 142.

Figure 4:
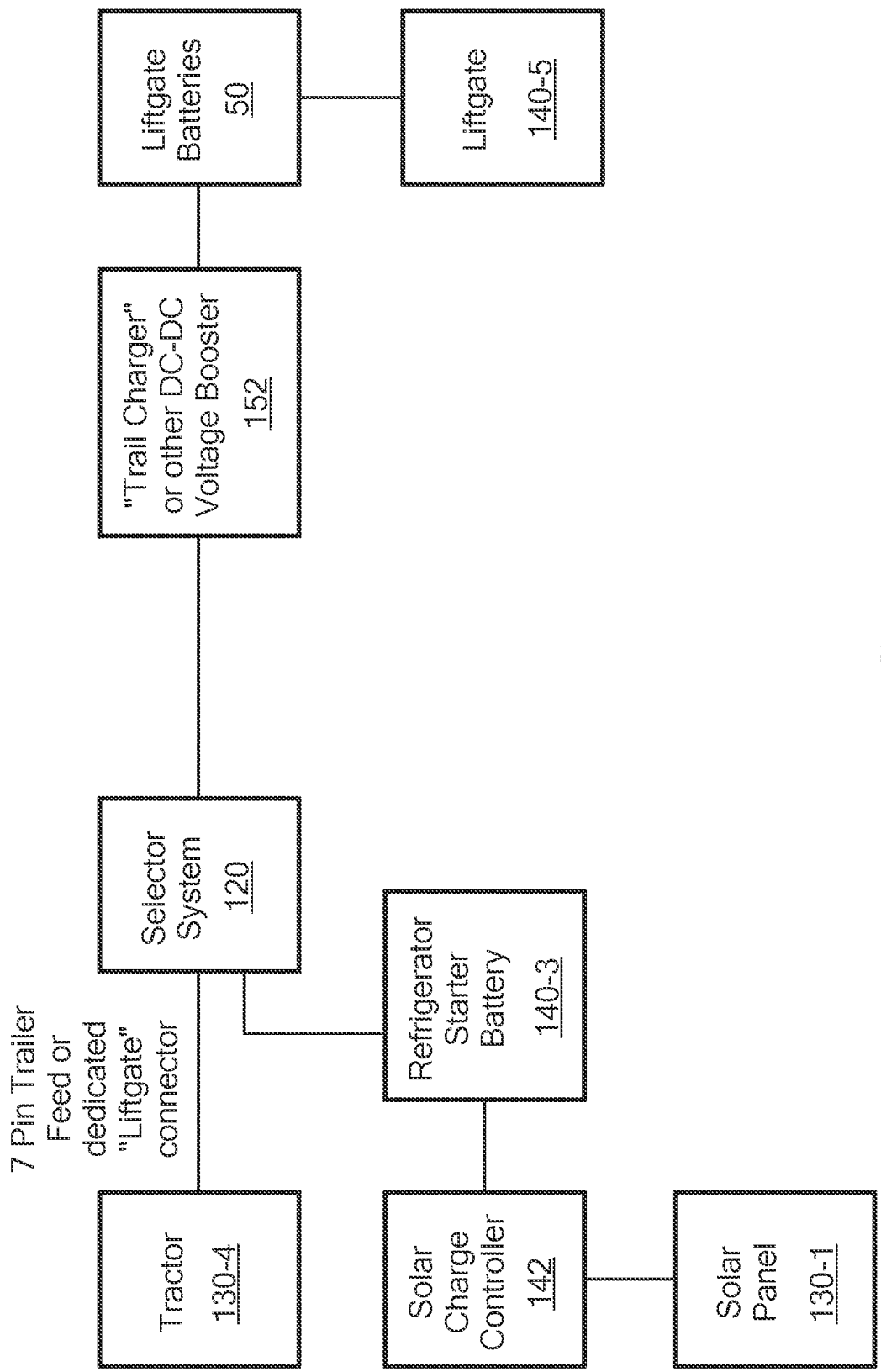
FIG. 4 is a block diagram of a particular configuration of the system of FIG. 1.

FIG. 4 is a block diagram of a particular configuration of the system of FIG. 1. A truck or tractor trailer combination may use the selector 120 for distributing power to charge auxiliary batteries, typically liftgate batteries. The power may come from the truck (tractor) main batteries (alternator) through a dual or single pole connector; the 7 pin trailer connector (tractor batteries and alternator) 130-4; or reefer engine battery. The selector 120 chooses the priority of source of power normally choosing the 7 pin or truck batteries first; than the reefer battery second. The selector does not merge power between multiple sources, but rather selects the source that has the highest potential for energy. If no energy source is available, the selector disconnects all sources. The selector system often also incorporates a "trail charger" or DC-DC voltage boost device 152 to compensate for the voltage drop from the selector to the liftgate batteries due to wire resistance and long wire distance.

Charging from solar energy is desired for charging both the auxiliary liftgate batteries as well as the reefer battery. When a trailer or truck is parked for a long time, the liftgate batteries will self discharge. Furthermore, liftgate batteries are often never fully charged due to frequent use and lack of drive time to charge the batteries. The reefer starter battery likewise will self discharge if left parked for a long time without an active refrigerated load which demands the diesel engine be started and the reefer battery charged. Charging from solar energy solves the above problems since power is always available as long as there is daylight. When a trailer or truck is parked for long periods of time the solar will maintain a full charge in the batteries. Likewise in delivery cycles when the truck is turned off, the liftgate batteries will continued to be charged. Typically to use solar charging, a separate solar panel and charge controller is needed for each set of batteries.

When the selector is installed using the reefer battery as one of the energy sources for charging the auxiliary liftgate batteries, the solar system needs only to be connected to the reefer battery and the selector will automatically divert excess solar energy to the liftgate batteries.

Therefore, the solar panel and corresponding charge controller is connected to the reefer battery. The output of the charge controller is set to the same or higher voltage that the selector is looking for that indicates that the reefer diesel engine is turned on. The selector will connect the reefer battery to the auxiliary liftgate battery and the auxiliary battery will be charged using energy from the reefer battery and solar energy. Alternatively, the selector may be modified to recognize a lower voltage coming from the reefer battery and engage knowing that this might be sourced from the solar and not the diesel engine generator/vehicle alternator. If the solar system is generating enough energy (current and voltage) to maintain a high threshold voltage on the reefer battery, such that the reefer battery is not discharging itself; the selector will keep the reefer battery and solar continually engaged until the auxiliary batteries are fully charged. If there is insufficient energy generated from the solar system to satisfy the energy needs of the auxiliary batteries, then the reefer battery will discharge to a predetermined voltage threshold and the selector will disconnect the reefer battery. At that time the solar panels will continue to charge the reefer battery until full as determined by higher voltage threshold which will then trigger the selector to engage the connection to the auxiliary battery. This will cause a cycling effect of charging and discharging the reefer battery. At no time does the selector let the reefer battery drop too low to start the Reefer diesel engine to cool the refrigerated load. Once the auxiliary batteries are completely charged and the reefer batteries are charged, the solar charge controller will decrease the amount of charging (current) flowing to the batteries and maintain the batteries in a float or trickle charge mode normally supplied by the charge controller. If the auxiliary batteries are discharged by using the liftgate or the reefer battery is used, the solar panels will return to full output and the process of charging all battery systems will start again.

Figure 5:
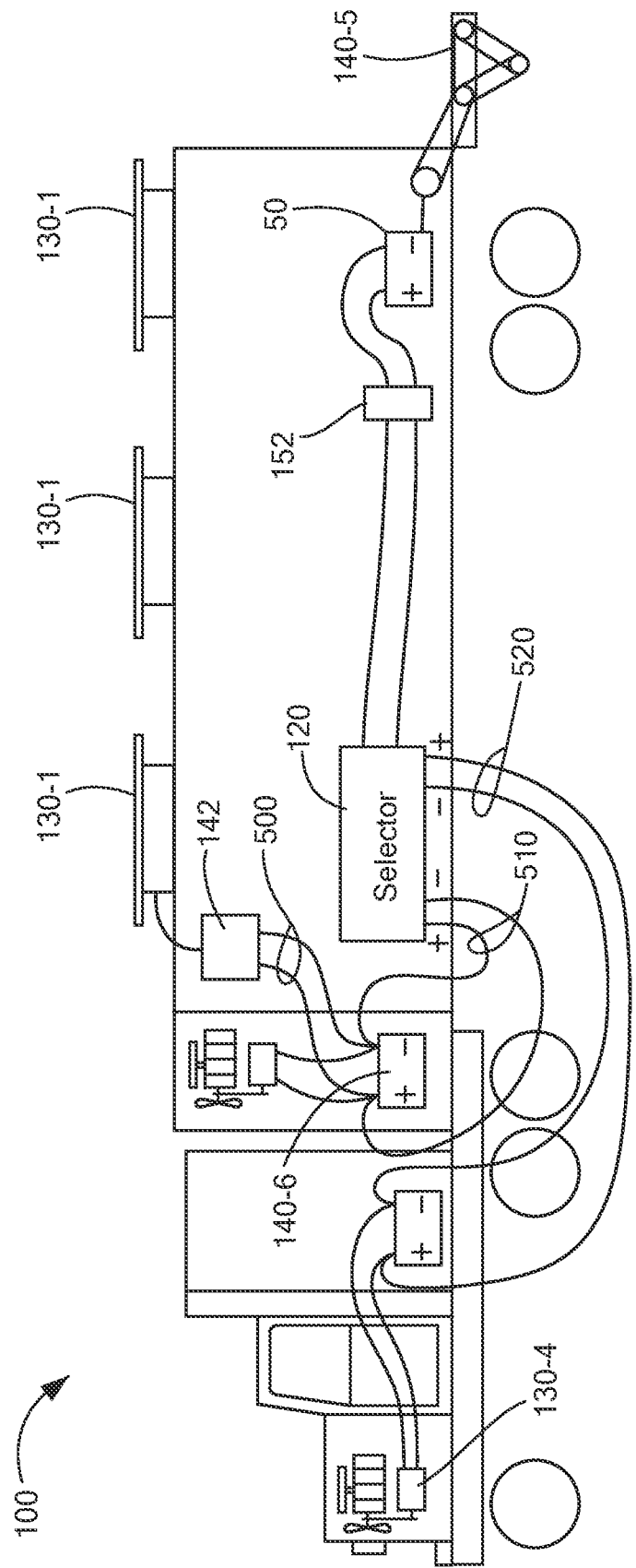
FIG. 5 is a schematic diagram of a particular configuration of the selector of FIGS. 1-4.

FIG. 5 is a schematic diagram of a particular configuration of the selector of FIGS. 1-4. Referring to FIGS. 1-5, in the example configuration discussed herein, a tractor trailer truck 100 includes a reefer (typically a condenser driven evaporator or cold plates) 140-3 relying on the reefer battery 140-6, defining the primary load and liftgate 140-5 defining an auxiliary load 50 by the corresponding battery. The solar panels 130-1 connect to the charge controller 142, which monitors the solar panel draw to divert power only if it is beneficial to the batteries, i.e. if it is above the current voltage level. A set of wires 500 connect to the reefer battery 140-6, operable to start the generator or other mechanism for refrigerating the cold plates 140-3 (FIG. 2). Selector wires 510 connect both poles (+,−) to the selector 120, for identifying the current voltage in the battery 140-6 and also the voltage received from the solar panels 130-1. Alternatively, a single set of wires may be common to the controller 142 and the battery 140-6, since the charge controller will only allow a beneficial (e.g. greater than ~12 v) through. A pair of propulsion battery/alternator wires 520 also provide input from the vehicle alternator 130-4. When the vehicle is running, this is likely to be somewhat above 12 v and would likely be determined by the selector as the greatest potential for charge. In either case, if a charge source greater than that of the auxiliary load 50 is available, then the selector 120 will switch the power source 130 to connect to and charge the auxiliary load 50, in this case the liftgate battery. In this particular arrangement, a voltage converter 152 such as a DC-DC converter may be provided between the liftgate 140-5 and the selector 120 along the length of the trailer. Since the liftgate 140-5 may be sensitive to voltage fluctuations, it is beneficial to dispose the voltage converter 152 as close as possible to the liftgate 140-5, to avoid line degradation of the voltage signal. The converter boosts the voltage level to the auxiliary load 50, such that the boosting accommodates a run of conductors to reach the battery of the auxiliary load when the auxiliary load 50 is disposed at the rear of the trailer.

Referring to FIGS. 1, 2, 5, 6 and 7, an alternate arrangement may include an all-electric reefer power system, rather than just a starting battery for a diesel generator to power the same. In such a scenario, the battery powers a refrigeration compressor rather than a starter and is substantially larger. Accordingly, a generative axle 510, also known as an e-axle, accompanies the solar panels as the primary source for the reefer battery. In other words, the reefer battery defines an electrical load corresponding to both the solar panels and the generative axle, i.e. both are a primary source for the reefer battery and refrigeration compressor.

The mobile refrigerated transport vehicle, typically the trailer 120, is configured for providing electric power to an electric load on the transport vehicle, and a storage element 240 for storing electrical power, often a battery of a suitable chemistry. One or more solar panels 212 define one of the primary sources, as complemented by other sources described further below. The refrigeration unit 130 is powered by the electric power from the battery, as charged by the solar panels 212. A converter or transformer 232 transforms electrical characteristics of the stored electric power from the storage element 240 to correspond to the refrigeration unit 130. The controller 252 determines distribution of the electric power from the passive vehicle source to the storage element 240 and the refrigeration unit 130.

One or more passive vehicle sources may be attached or configured to the trailer 120, such that each passive vehicle source supports production of electric power from sources incidental to transport of the refrigerated transport vehicle. One of the passive sources is defined by the solar panel array 212. As with previous configurations, the solar panel array 212 is disposed on a roof of the transport vehicle 120, such that the roof encloses a refrigerated compartment cooled by the refrigeration unit. Typically, the transport vehicle 120 is an articulated trailer, however straight frame "box" trucks may also employ all the disclosed features; a distinction is only the length of the refrigerated cargo area 122, as well as a corresponding relaxation of the cooling power needed. Class 8 tractor trailer examples are used to illustrate the maximum performance of the systems herein.

FIG. 7 is a perspective view of the generative axle in FIG. 6. A large transport vehicle traveling at high speed exhibits a tremendous amount of inertial energy. Upon braking, this kinetic energy is converted to heat by the vehicle brakes. Regenerative brakes may be employed to convert a deceleration force to energy. Alternatively, such momentum generation may include a passive source defined by a generative axle 510 assembly configured to passively generate electric power from motive transport of the transport vehicle 120. The generative axle 510 includes a live axle 514 disposed between opposed wheels 516 and tires supporting the transport vehicle, and a generator 520 responsive to rotational input for generating electrical energy. A differential 518 centered between the opposed wheels couples the live axle 514 to the generator 520 for transmitting the rotational input based on movement of the wheels 516. The configuration of FIG. 6 therefore includes a solar panel array 212 and a generative axle 510 as vehicle created sources of power. Similar to the enhanced alternator configuration above, the controller 252 is configured for prioritizing transmission of the electric power for supporting minimum requirements of the refrigeration unit 130, and for transmitting excess electric power for charging the storage element 240 upon satisfaction of the requirements of the refrigeration unit.

Although the generative axle 510 harvests rotational energy from the wheels, and therefore imposes a slight drag, selective engagement of the generative axle engages the generator 520 only when coasting and braking, and avoids burdening the motive vehicle (i.e. tractor) with additional drag when accelerating or traveling up grade. Although the generative axle and the trailer wheels share an indirect kinetic source with the diesel engine in the tractor, this burden is negligible to non-existent. The effect of gravity also effects inertial force of the trailer, and switching/control of the generator 520 based on inertia can filter any imposition on the diesel sourced power by generator activation only during braking or coasting, when the momentum would likely be lost as heat energy due to braking.

Accordingly, a momentum generation controller 522 regulates the regenerative axle 510. The momentum generation controller 522, disposed on the generator 520, is responsive to the controller 252 and includes an inertial sensor 524. The inertial sensor 524 includes one or more accelerometers or gyros, and is configured to disengage generation of electric power from the generative axle based on detection of ascending grade movement of the transport vehicle. The inertial sensor 524 identifies angular, centrifugal and inertial forces due to grade, turning, acceleration and other movements to identify when the transport vehicle is traveling up grade, coasting, braking or decelerating, cruising at equilibrium, or stationary. The momentum generation controller is further operable to disengage generation of electric power when acceleration or maintaining speed via cruising is identified. Acceleration and travel up a grade burdens the diesel tractor most significantly, and invocation of the generator at these times may have a detrimental effect. In contrast, engaging the generator 520 at constant speed cruising impacts efficiency negligibly. Braking, or coasting down grade when service brakes are likely to be applied anyway, effectively harvests the kinetic energy for electrical generation in lieu of being converted to heat by the brakes. Braking may also be detected from the brake lights on the trailer, affirmatively indicating brake application.

It will be appreciated by those skilled in the art that alternate configurations of the disclosed invention, particularly with respect to programmed logic and/or control features disclosed above, include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a non-transitory computer readable storage medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

While the apparatus and methods defined herein have been particularly shown and described with references to embodiments thereof, it will be understood by those skilled in the art that various changes in form and details may be made therein without departing from the scope of the invention encompassed by the appended claims.

The invention claimed is:

1. A method comprising:
measuring, by a selector, voltages of a plurality of power sources and a voltage of an auxiliary load, each power source of the plurality of power sources coupled to at least one corresponding primary load;
determining, by the selector, that the voltage of the auxiliary load is below a nominal amount;
determining, by the selector, that multiple power sources of the plurality of power sources have an excess voltage above a minimum requirement of the at least one corresponding primary load;
directing, by the selector, the excess voltage of a power source of the multiple power sources having the most potential for excess charge capacity to the auxiliary load;
monitoring, by the selector, the voltage of the power source as the excess voltage is directed to the auxiliary load; and
terminating, by the selector, the directing the excess capacity to the auxiliary load when the voltage of the power sources reaches a minimal level.

2. The method of claim 1, wherein the most potential for excess charge capacity is based on an amount of the excess voltage.

3. The method of claim 1, wherein the plurality of power sources comprises a reefer power system configured to power an electrical load defined by an electric refrigeration compressor and a bank of solar panels.

4. The method of claim 1, wherein the plurality of power sources comprises a momentum generator coupled to a trailer axle.

5. The method of claim 1, wherein the plurality of power sources comprises cab vehicle power and a reefer power system configured to power a starter of a trailer refrigeration unit, the cab vehicle power providing a higher capacity when an alternator on the cab vehicle is activated by a running engine.

6. The method of claim 5, further comprising:
comparing an output from the cab vehicle power and the reefer power to identify a higher voltage.

7. The method of claim 5, wherein the cab vehicle power system further comprises an alternator.

8. The method of claim 5, wherein the reefer power system further comprises a solar panel and charge controller.

9. The method of claim 1, wherein the plurality power sources comprise a solar panel and a charge controller.

10. The method of claim 1, further comprising:
adjusting, by a converter, the excess voltage to correspond to voltage requirements and electrical path of the auxiliary load.

11. A selector device comprising:
an interface coupled to a plurality of power sources and an auxiliary load, each power source of the plurality of power sources coupled to at least one corresponding primary load; and
a processor operatively coupled to a memory configured to store control logic, the control logic, when executed by the processor, configured to cause the processor to:
measure, via the interface, voltages of the plurality of power sources and a voltage of the auxiliary load;
determine that the voltage of the auxiliary load is below a nominal amount;
determine that multiple power sources of the plurality of power sources have an excess voltage above a minimum requirement of the at least one corresponding primary load;
direct, via the interface, the excess voltage of a power source of the multiple power sources having the most potential for excess charge capacity to the auxiliary load;
monitor, via the interface, the voltage of the power source as the excess voltage is directed to the auxiliary load; and
terminate the directing the excess capacity to the auxiliary load when the voltage of the power sources reaches a minimal level.

12. The device of claim 11, wherein the most potential for excess charge capacity is based on an amount of the excess voltage.

13. The device of claim 11, wherein the plurality of power sources comprises a reefer power system configured to power an electrical load defined by an electric refrigeration compressor and a bank of solar panels.

14. The device of claim 11, wherein the plurality of power sources comprises a momentum generator coupled to a trailer axle.

15. The device of claim 11, wherein the plurality of power sources comprises cab vehicle power and a reefer power system configured to power a starter of a trailer refrigeration unit, the cab vehicle power providing a higher capacity when an alternator on the cab vehicle is activated by a running engine.

16. The device of claim 15, wherein the control logic, when executed by the processor, further causes the processor to:
compare an output from the cab vehicle power and the reefer power to identify a higher voltage.

17. The device of claim 15, wherein the cab vehicle power system further comprises an alternator.

18. The device of claim 15, wherein the reefer power system further comprises a solar panel and charge controller.

19. The device of claim 11, wherein the plurality power sources comprise a solar panel and a charge controller.

20. The device of claim 11, wherein the excess voltage is adjusted by a converter to correspond to voltage requirements and electrical path of the auxiliary load.

* * * * *